S. DEUTSCH.
FLOAT CONTROLLED ELECTRIC INDICATOR.
APPLICATION FILED JUNE 3, 1915.
1,222,189.
Patented Apr. 10, 1917.
2 SHEETS—SHEET 1.
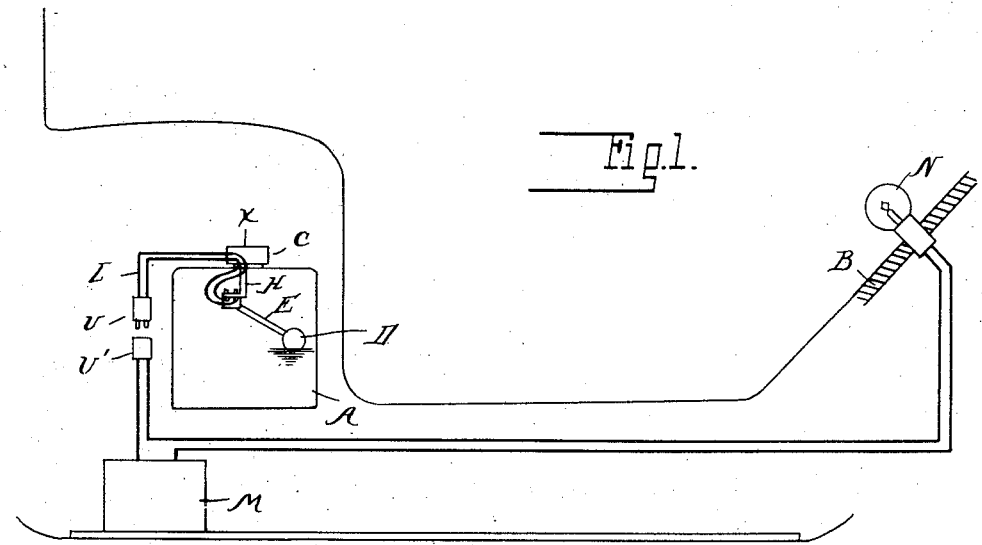
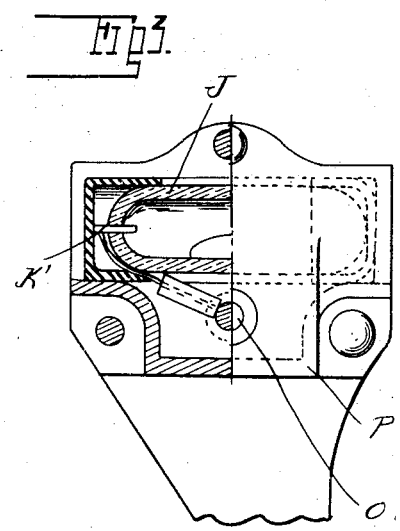
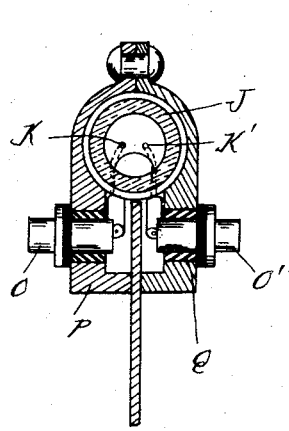
Inventor
Simon Deutsch
By Whittemore Hulbert & Whittemore
Attorneys

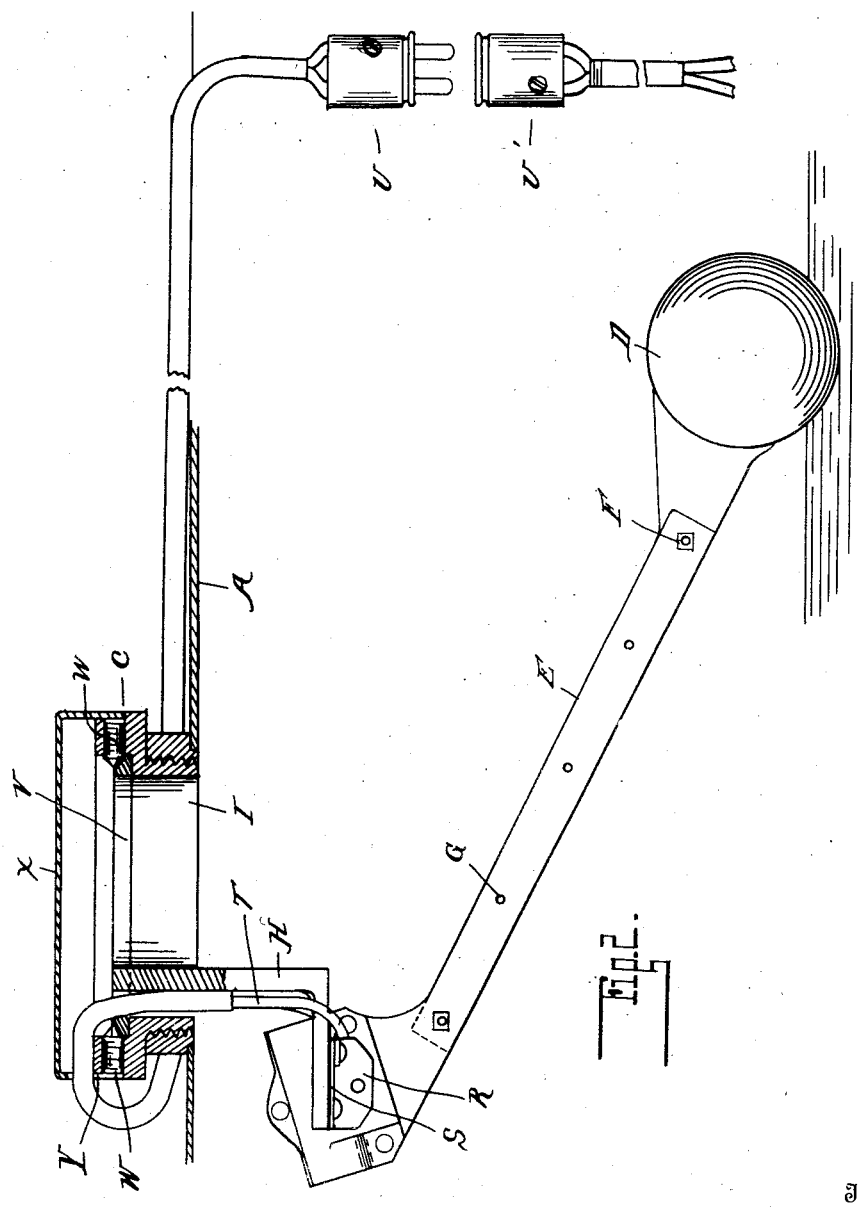

UNITED STATES PATENT OFFICE.

SIMON DEUTSCH, OF DETROIT, MICHIGAN.

FLOAT-CONTROLLED ELECTRIC INDICATOR.

1,222,189.  Specification of Letters Patent.  Patented Apr. 10, 1917.

Application filed June 3, 1915. Serial No. 32,006.

*To all whom it may concern:*

Be it known that I, SIMON DEUTSCH, a citizen of the United States of America, residing at Detroit, in the county of Wayne and State of Michigan, have invented certain new and useful Improvements in Float-Controlled Electric Indicators, of which the following is a specification, reference being had therein to the accompanying drawings.

The invention relates to float-controlled electric indicators, and has for its object the obtaining of a construction applicable to the liquid-fuel tanks of automobiles. It is a further object to obtain a device which will call to the attention of the driver the fact that the supply of fuel is low while there is still sufficient remaining to run the machine to a point of supply. Still another object is to obtain a single construction to manufacture, which may be inserted into the tank through the fill opening and which does not interfere with the admission of the liquid fuel through the same opening.

In the drawings:

Figure 1 is a diagram of the apparatus as applied to the fuel tank of an automobile;

Fig. 2 is a sectional elevation showing the float and its mounting in relation to the fill opening for the tank;

Fig. 3 is a sectional elevation showing the mercury switch; and

Fig. 4 is a cross section thereof.

A represents the fuel tank of an automobile and B the dash or foot board. My improved indicator comprises a float and a mounting therefor, constituting a unit which is attachable to the tank by being inserted through the usual fill opening C thereof, and which carries an electric switch for controlling an alarm signal, preferably an incandescent light mounted on the dash. As shown, D is the float having an arm E which is adjustable in length, being preferably formed in two sections secured together by bolts F engaging a series of apertures G. The upper end of the arm is pivotally mounted upon a bracket H, which is secured to and depends from a bushing or tubular fitting I engaging the fill opening C. The arrangement is such that the float and its arm may be first inserted through the fill opening and the bushing I, then engaged with the tank, as shown in Fig. 2. At the upper end of the arm E there is carried an electric switch, preferably a mercury switch, comprising the glass tube J containing a globule of mercury, and the separated electric contacts K and K' sealed in said tube and connected by the mercury when the tube is suitably tilted. The contacts K and K' are connected with an electric circuit L, which includes a battery M or other source of current, and also an indicator light N, preferably mounted on the dash.

Inasmuch as the switch is located in the fuel tank where there is always present a highly explosive mixture, it is absolutely essential to guard against an electric spark that might ignite this mixture. This danger is avoided, first, by the placing of the electrodes K and K' in a sealed tube so that the spark occasioned by the opening of the circuit is completely guarded from the explosive vapor. A further safeguard is an unbroken and practically unbreakable connection between the electrodes K and K' and the external electric circuit, preferably constructed as follows:

O and O' are metallic pins forming trunnions or pivots for the arm E. These are mechanically secured to the head P at the upper end of the arm E and which forms the mounting for the mercury switch, but electrical connection between the pivots and said head is broken by insulator bushings Q. The projecting ends of the pins O and O' pass through bearings R which are mounted upon the bracket arm H, but are insulated therefrom as indicated at S. T are insulated conductors, the ends of which are soldered or otherwise secured to the ends of the pins O and O' to form an unbroken connection. These conductors pass upward adjacent to the bracket H and are connected into the circuit L, preferably by a coupling U.

The bushing I preferably is provided with a threaded portion for engaging the usual threaded aperture in the fuel tank. As it is essential that the arm E should extend longitudinally of the tank so as to avoid contact with the walls thereof, instead of making the arm H integral with the bushing I, said arm is attached to a collar V which rotatively engages said bushing and may be locked in any position by set screws W. A suitable slip cap X is provided and is engageable with a threaded bearing upon the sleeve I, this cap being slotted at Y for the passage of the conductors T.

With the construction as described, to apply the same to an automobile tank, it is first necessary to determine the minimum quantity of liquid fuel that is to remain in the tank when the signal is displayed. The float arm E is then adjusted in length so that when the float drops to the level of this minimum quantity of liquid fuel the mercury switch will be operated to close the circuit. The whole assembly is then mounted upon the tank by first inserting the float through the fill aperture and also the switch and supporting bracket arm H. The sleeve I is then secured to its seat, after which the set screws W are tightened to lock the ring V in position and hold the bearings for the float in the proper relation. The conductors T form a part of the assembly and extend outward from the tank to the coupling U, which may be then engaged with the complementary socket U' which connects it into the circuit L. This circuit is suitably arranged upon the car, but the signal light N is so positioned as to be in constant view of the driver.

In operation, whenever the liquid in the tank falls to the minimum limit the light will be flashed and the attention of the driver called to the fact that the supply must be renewed. This he is enabled to do even where the vehicle is at some distance from a supply station, as a sufficient quantity of fuel is still in the tank for this purpose.

What I claim as my invention is:—

1. The combination with a liquid fuel tank provided with a fill aperture, of a float-controlled electric indicator assembly for attachment to said tank, comprising a pivotal float arm, a mounting therefor within and to one side of the fill aperture, a sealed electric switch carried by said float arm, and unbroken external electrical connections for said switch.

2. The combination with a liquid fuel tank provided with a fill aperture, of an attachable float-controlled electric indicator therefor, comprising a pivotal float arm insertible through the fill opening of the tank, a bushing for said fill opening, means upon said bushing and to one side of the fill aperture pivotally carrying said float arm, a sealed electric switch mounted on said float arm, and unbroken electrical external connections leading from said switch out through said fill opening.

3. The combination with a liquid fuel tank provided with a fill aperture, of a float-controlled electric indicator assembly for attachment to said tank, comprising a bushing for engagement with the fill opening, a depending and laterally-extending arm on said bushing and to one side of the fill opening, a float arm pivotally mounted in said depending arm, a float carried by said float arm, a sealed electric switch mounted on said float arm, and unbroken external electrical connections extending from said switch out through said bushing.

4. The combination with a liquid fuel tank, of an electric indicator assembly attachable thereto, comprising a threaded bushing for engagement with the threaded fill nipple of the tank, an arm depending from said bushing to one side of the fill nipple and extending laterally, a float arm pivotally mounted on the lateral extension of said bushing arm, a float adjustably connected to said float arm, a sealed electric switch mounted on said float arm, unbroken external electrical connections extending from said switch out through said bushing, means permitting a relative rotative movement of said threaded sleeve and bracket arm, locking means for holding said parts from rotation, and a cap for closing the opening in said bushing.

5. The combination with a liquid fuel tank provided with a fill opening, of a float-controlled electric indicator assembly for attachment to said tank, comprising a float mounted within and to one side of said fill opening, an electric switch, external electrical connections for said switch, and means actuated by said float for operating said switch.

6. The combination with a liquid fuel tank, of a float-controlled electric indicator assembly for attachment to said tank, said unit comprising a float-controlled means insertible through the fill opening of the tank and mounted at one side thereof for opening and closing an electric circuit.

7. The combination with a liquid fuel tank, of a float controlled electric indicator assembly for attachment to said tank, comprising an arm extending through the fill opening of the tank, a float arm, a sealed tube carried by said float arm, electrodes within said sealed tube, pins extending through and insulated from said float arm, electrically connected to said electrodes, brackets secured to and insulated from said arm extending through the fill opening and engaging said pins, and electrical conductors secured to said pins, and passing through the fill opening.

In testimony whereof I affix my signature in presence of two witnesses.

SIMON DEUTSCH.

Witnesses:
 EVA LEVANDER,
 S. GUILEMAN.